(12) United States Patent
Rogers

(10) Patent No.: US 8,118,368 B1
(45) Date of Patent: Feb. 21, 2012

(54) SADDLE ASSEMBLY FOR A SIDE-DUMP TRAILER OR TRUCK

(76) Inventor: Ralph R. Rogers, Dakota Dunes, SD (US)

( * ) Notice: Subject to any disclaimer, the term of this patent is extended or adjusted under 35 U.S.C. 154(b) by 0 days.

(21) Appl. No.: 12/924,317

(22) Filed: Sep. 24, 2010

(51) Int. Cl.
*B60P 1/16* (2006.01)
(52) U.S. Cl. ............... 298/17.7; 298/17.6; 298/22 R
(58) Field of Classification Search .............. 298/17.7, 298/22 R, 13, 17.6, 22 P, 22 F, 21 R, 19 V, 298/23 MDD, 25; 414/470
See application file for complete search history.

(56) References Cited

U.S. PATENT DOCUMENTS

| | | | |
|---|---|---|---|
| 5,480,214 A | 1/1996 | Rogers | |
| 5,845,971 A | 12/1998 | Rogers | |
| 5,906,417 A * | 5/1999 | Golden | ............ 298/17.6 |
| 5,967,615 A | 10/1999 | Rogers | |
| 6,056,368 A | 5/2000 | Rogers | |
| 6,089,670 A | 7/2000 | Rogers | |
| 6,106,072 A * | 8/2000 | Lutter, Jr. | ............ 298/17.7 |
| 6,179,385 B1 | 1/2001 | Rogers | |
| 6,199,955 B1 | 3/2001 | Rogers | |
| 6,257,670 B1 | 7/2001 | Rogers | |
| 6,402,453 B1 | 6/2002 | Rogers | |
| 6,425,726 B1 | 7/2002 | Rogers | |
| 6,428,264 B1 | 8/2002 | Rogers | |
| 6,520,589 B2 | 2/2003 | Jensen et al. | |
| 6,669,304 B2 * | 12/2003 | Binning | ............ 298/17.7 |
| 6,905,175 B1 * | 6/2005 | Verros | ............ 298/17.7 |
| 7,032,950 B2 * | 4/2006 | Eggers et al. | ............ 296/98 |
| 7,360,843 B1 | 4/2008 | Rogers | |
| 7,478,883 B1 | 1/2009 | Rogers | |
| 7,611,187 B1 | 11/2009 | Rogers | |
| 7,722,126 B2 | 5/2010 | Rogers | |
| 7,789,467 B2 | 9/2010 | Rogers | |
| 7,819,486 B2 | 10/2010 | Rogers | |
| 7,992,942 B2 * | 8/2011 | Heider et al. | ............ 298/18 |

* cited by examiner

*Primary Examiner* — Glenn Dayoan
*Assistant Examiner* — Sunsurraye Westbrook
(74) *Attorney, Agent, or Firm* — Dennis L. Thomte; Thomte Patent Law Office LLC

(57) ABSTRACT

An improved saddle assembly for a side-dump trailer or truck wherein the saddle assemblies have saddle supports which are located directly above the frame members of the wheeled frame of the side-dump vehicle. The saddle supports receive the pivot pins of the side-dump body with the loads imposed thereon being transferred to the frame members of the wheeled frame of the side-dump body.

6 Claims, 5 Drawing Sheets

SADDLE ASSEMBLY FOR A SIDE-DUMP TRAILER OR TRUCK

BACKGROUND OF THE INVENTION

1. Field of the Invention

This invention relates to an improved saddle assembly for a side-dump trailer or truck. More particularly, a plurality of the improved saddle assemblies are secured to the frame means of the truck or trailer with each of the saddle assemblies being located directly above the longitudinally extending frame members of the truck or trailer frame means.

2. Description of the Related Art

In recent years, side dump bodies mounted on trailers or trucks have become extremely popular. The inventor of the instant invention has obtained many patents on side dump bodies with one of the first patents being U.S. Pat. No. 5,480,214 to Ralph R. Rogers.

In most of Applicant's prior art patents relating to side-dump trailers and trucks and in most of the side-dump bodies of the competitors of the assignee of this invention, the side dump bodies are pivotally mounted on a truck or trailer frame in a manner so that they may be dumped to either side of the truck or trailer frame. In most cases, pivot pins are secured to the sides of the side-dump body with the pivot pins being received in saddle assemblies which are positioned outwardly of the longitudinally extending frame members of the truck or trailer in a cantilever fashion such as seen in FIGS. 1 and 2. In FIG. 1, which is a partial rear perspective view of the side-dump trailer in Applicant's earlier U.S. Pat. No. 5,480,214, the rear saddle assemblies 10 and 12 are supported by a frame means 14 so that the saddle assemblies 10 and 12 are positioned laterally outwardly of the frame members 16 and 18 respectively which places a great deal of stress on the outer ends of the frame means 14. The same is also true for the saddle assemblies located at the forward end of frame members 16 and 18.

In the prior art structure of FIG. 2, the saddle assemblies 20 and 22 are mounted on supports 24 and 26 respectively which extend laterally from frame members 28 and 30 respectively in a cantilever fashion. The structure of FIG. 2 does perform satisfactorily, as does the structure of FIG. 1, but like the prior art structure of FIG. 1, a great deal of stress is placed on the supports 24 and 26.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An improved saddle assembly is disclosed for use with a side-dump trailer or truck. The side-dump trailer or truck includes a wheeled frame having a forward end, a rearward end, a first side and a second side. The wheeled frame includes a pair of longitudinally extending first and second frame members.

An elongated side-dump body is selectively pivotally movably positioned on the wheeled frame and has a forward end, a rearward end, opposite sides, and an open upper end for receiving materials to be transported. The side-dump body includes a bottom wall, a forward wall, a rearward wall, and first and second side walls which extend upwardly and outwardly from the bottom wall. First, second, third and fourth saddle assemblies are provided which include first, second, third and fourth saddle supports respectively. The first saddle assembly is supported upon the first frame member adjacent the forward end thereof so that the first saddle support thereof is positioned directly above the first frame member. The second saddle assembly is supported upon the first frame member rearwardly of the first saddle assembly so that the second saddle support thereof is positioned directly above the first frame member. The third saddle assembly is supported upon the second frame member adjacent the forward end thereof so that the third saddle support thereof is positioned directly above the second frame member. The fourth saddle assembly is supported upon the second frame member rearwardly of the third saddle assembly so that the fourth saddle support thereof is positioned directly above the second frame member.

A first pivot pin is secured to the side-dump body at the first side thereof adjacent the forward end thereof which is adapted to be selectively removably and pivotally received by the first saddle support. A second pivot pin is secured to the side-dump body at the first side thereof adjacent the rearward end thereof which is adapted to be selectively removably and pivotally received by the second saddle support. A third pivot pin is secured to the side-dump body at the second side thereof adjacent the forward end thereof which is adapted to be selectively removably and pivotally received by the third saddle support. A fourth pivot pin is secured to the side-dump body at the second side thereof adjacent the rearward end thereof which is adapted to be selectively removably and pivotally received by the fourth saddle support.

The first, second, third and fourth saddle assemblies include first, second, third and fourth locking devices respectively which are selectively movable between locked and unlocked positions for selectively maintaining the first, second, third and fourth pivot pins in the first, second, third and fourth saddle supports respectively when in their locked positions. A first power cylinder is provided at the forward end of the side-dump body and a second power cylinder is provided at the rear end of the side-dump body for pivotally moving the side-dump body between its transport and dumping positions.

In the preferred embodiment, the first, second, third and fourth saddle supports are located directly above the frame members and are centered with respect thereto. In the preferred embodiment, the first and third saddle supports are secured to a transversely extending cross-frame member which extends between and over the first and second frame members at their forward ends and which is secured thereto. In the preferred embodiment, the second and fourth saddle supports are secured to a transversely extending cross-frame member which extends between and over the first and second frame members at the rearward ends thereof and which is secured thereto.

It is therefore a principal object of the invention to provide an improved saddle assembly for a side-dump trailer or truck.

A further object of the invention is to provide saddle assemblies for a side-dump trailer or truck wherein the saddle assemblies are located directly above the longitudinally extending frame members of the truck or trailer.

It is a further object of the invention to provide an improved saddle assembly which eliminates the supports thereof being positioned laterally outwardly of the frame members in a cantilever fashion thereby reducing the stress on the supporting structure for the saddle assemblies.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
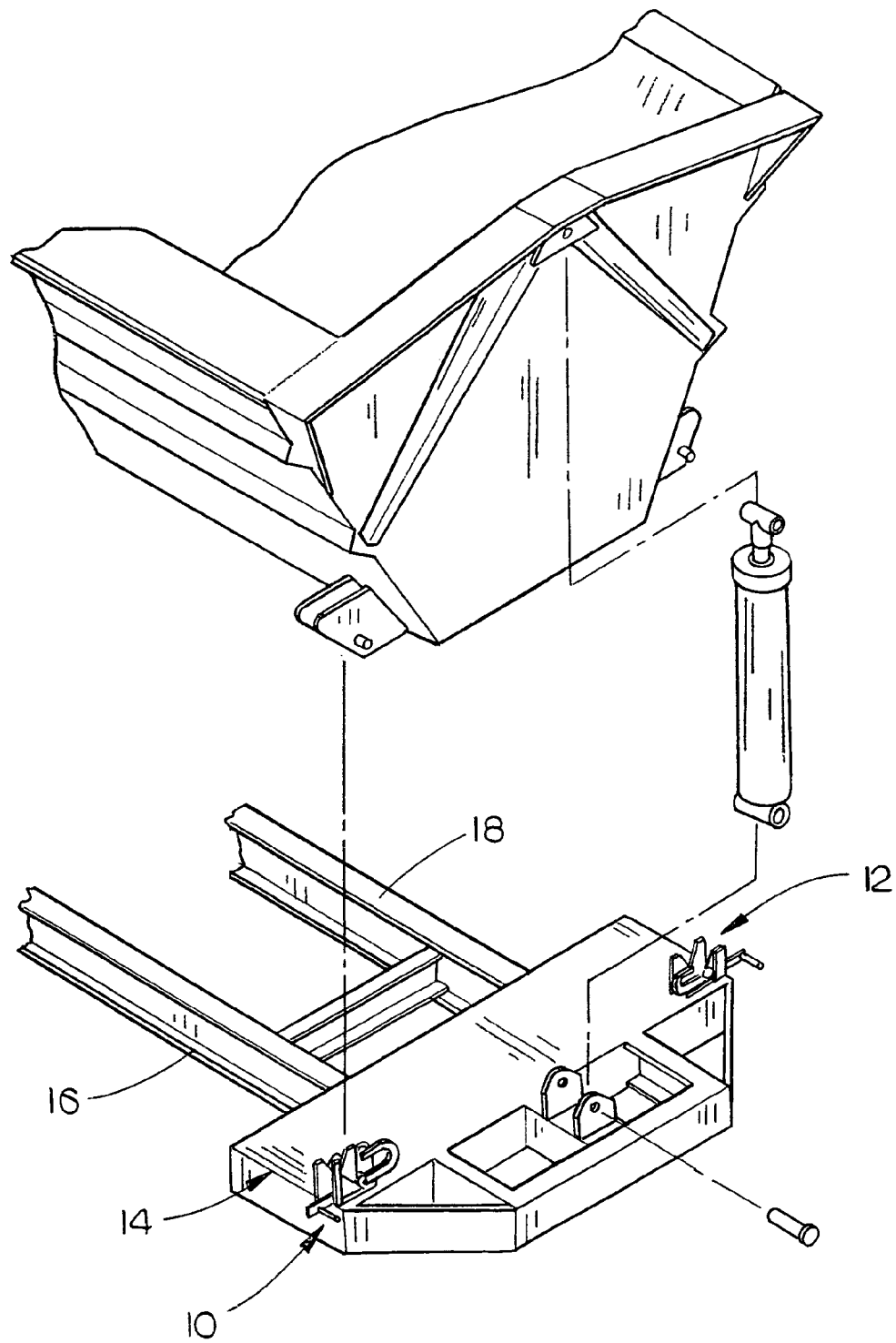
FIG. 1 partially illustrates a prior art side-dump body wherein the saddle assemblies thereof are located laterally outwardly of the frame members of the truck or trailer.
Figure 2:
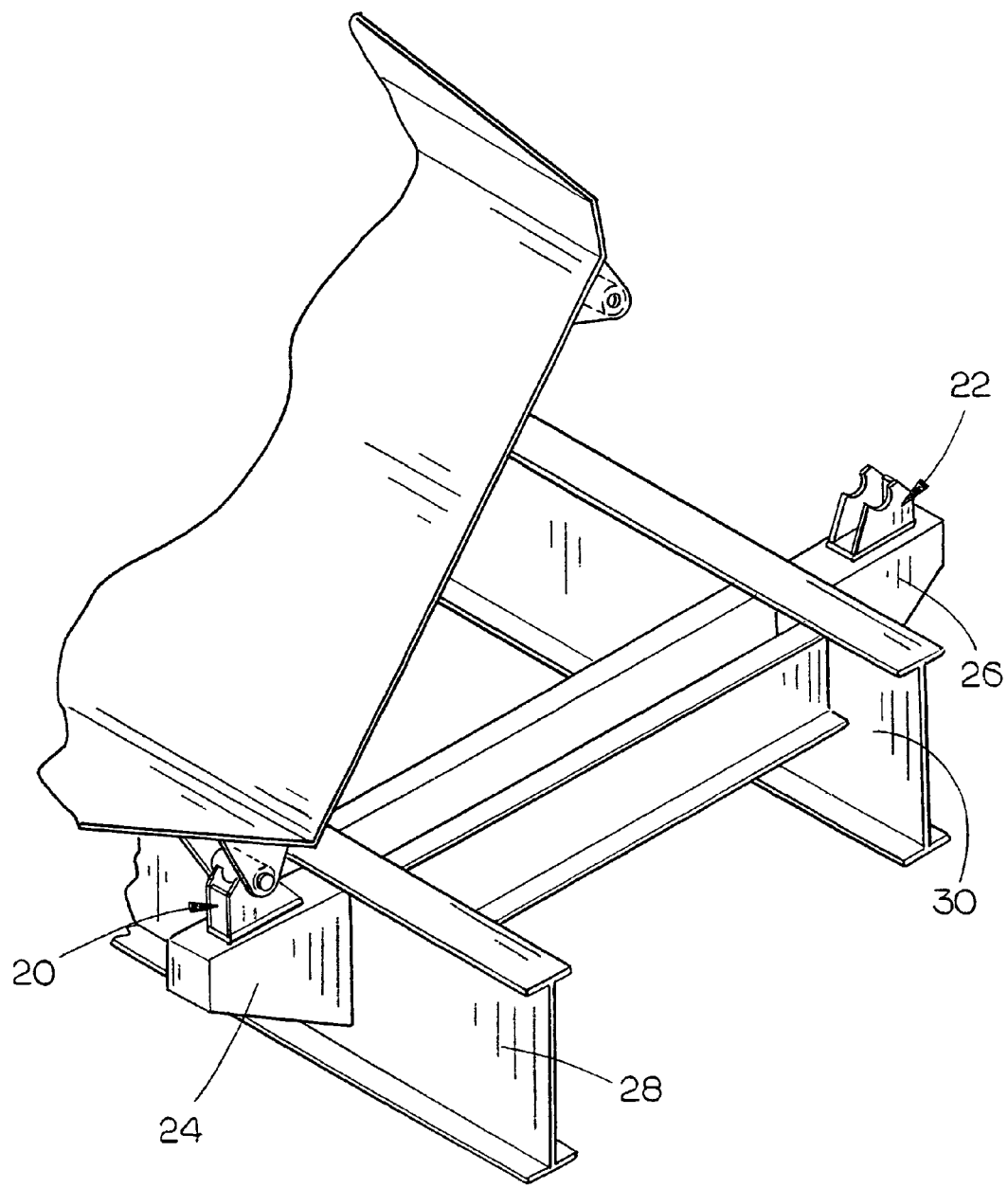
FIG. 2 is a partial perspective view illustrating a prior art side-dump body wherein the saddle assemblies thereof are positioned outwardly of the frame members of the truck or trailer in a cantilever fashion.
Figure 3:
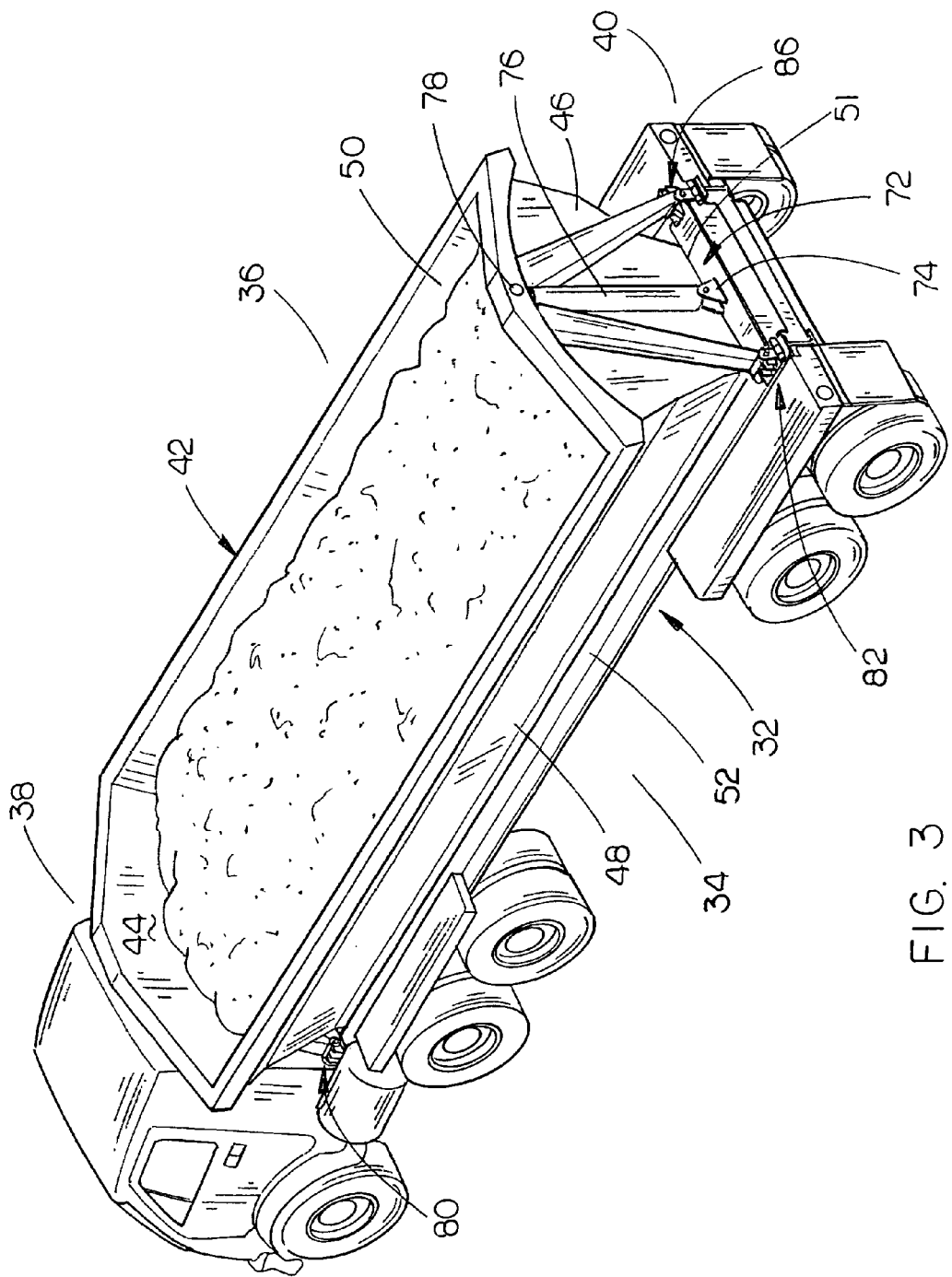
FIG. 3 is a rear perspective view of a side-dump trailer having the saddle assemblies of this invention mounted on the longitudinally extending frame members of the trailer.

In FIG. 3, the numeral 32 refers to a wheeled frame which may be part of a truck or trailer. For purposes of description, the wheeled frame 32 will be described as having a left side 34, a right side 36, a forward end 38, and a rearward end 40. A conventional side-dump body such as disclosed in U.S. Pat. No. 5,480,214 is illustrated in FIG. 3 and is referred to generally by the reference numeral 42. For purposes of description, side-dump body 42 will be described as having a forward end wall or bulk head 44, a rearward end or bulk head 46, a first side wall 48, a second side wall 50, and a bottom wall 52 which may be curved or flat. Bottom wall 52 may be integrally formed with side walls 48 and 50. Wheeled frame 32 includes a first longitudinally extending frame member 52 and a second longitudinally extending frame member 54. Frame member 52 includes a horizontally top disposed flange 56, a bottom flange 58 and a vertically disposed web 60 extending therebetween. Frame member 54 includes a horizontally disposed top flange 62, a horizontally disposed bottom flange 64, and a vertically disposed web 66 extending therebetween.

Figure 4:
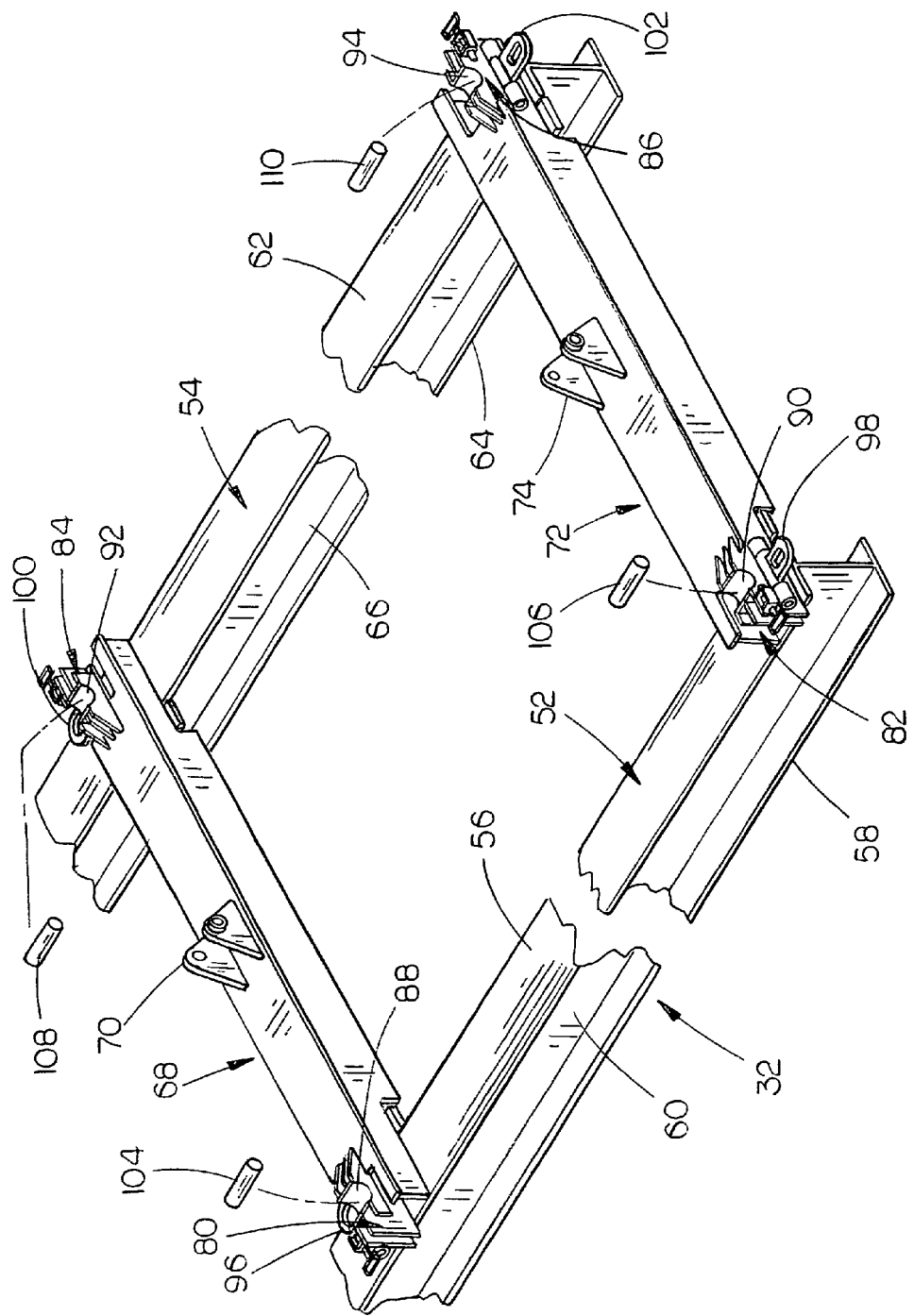
FIG. 4 is a partial rear perspective view illustrating first, second, third and fourth saddle assemblies secured to the longitudinally extending frame members of a trailer or truck.

A transversely extending cross-frame 68 is secured to frame members 52 and 54 at the forward ends thereof and extends therebetween as seen in FIG. 4. Cross-frame 68 has a mounting bracket 70 provided thereon at the center thereof to which the base end of the conventional forward hydraulic cylinder is attached for pivotally moving the side-dump body. The rod end of the hydraulic cylinder is pivotally secured to the forward end wall 44 in conventional fashion.

A transversely extending cross-frame 72 is secured to frame members 52 and 54 at the rearward ends thereof and extends therebetween as seen in FIG. 4. Cross-frame 72 has a mounting bracket 74 provided thereon at the center thereof to which the base end of the conventional rearward hydraulic cylinder 76 is attached for pivotally moving the side-dump body. The rod end of the hydraulic cylinder 76 is pivotally secured to the rearward end wall 46 at 78 in conventional fashion.

A first saddle assembly 80 is secured to the first end of cross-frame 68. A second saddle assembly 82 is secured to the first end of cross-frame 72. A third saddle assembly 84 is secured to the second end of cross-frame 72 and a fourth saddle assembly 86 is secured to the second end of cross-frame 72. Saddle assemblies 80, 82, 84 and 86 include U-shaped saddle supports 88, 90, 92 and 94 respectively. Saddle supports 88 and 90 are positioned directly above frame member 52 and are centered over flange 56. Saddle supports 92 and 94 are positioned directly above frame member 54 and are centered over flange 62.

Saddle assemblies 80, 82, 84 and 86 include locking devices 96, 98, 100 and 102 respectively for locking the pivot pins therein as will be described hereinafter. Pivot pins 104 and 106 are secured to the side-dump body 42 at one side thereof which are adapted to be received in the saddle supports 88 and 90 respectively. Pivot pins 108 and 110 are secured to the other side of side-dump body 42 which are adapted to be received in the saddle supports 92 and 94 respectively.

Figure 5:
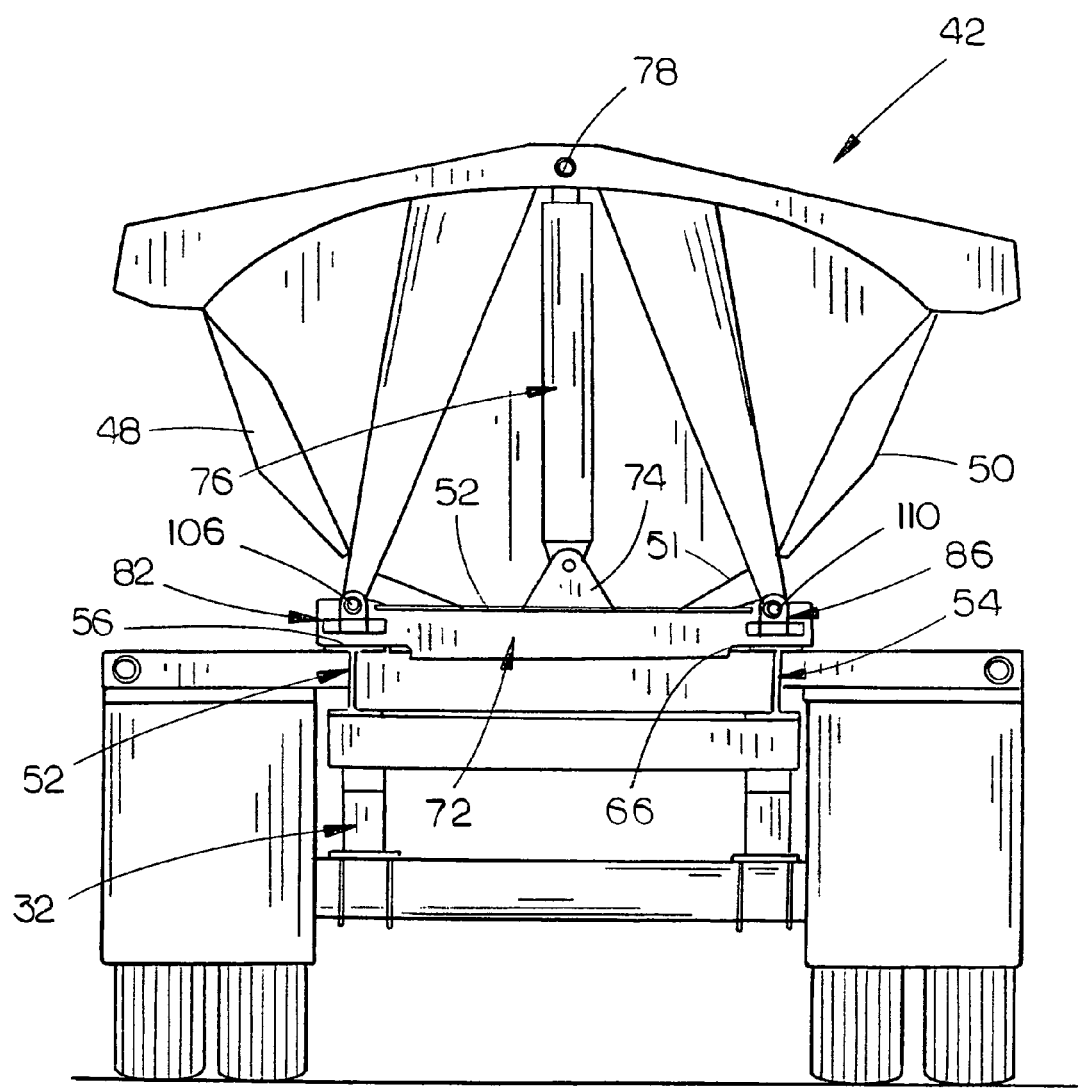
FIG. 5 is a rear view of the trailer of FIG. 3.

The side-dump body illustrated in FIGS. 3 and 5 is operated in conventional fashion. If it is desired to move the side-dump body 42 from the transport position of FIG. 3 to a dumping position at the left side of the wheeled frame 32, locking devices 100 and 102 are moved to the unlocked position. The hydraulic cylinders at the forward and rearward ends of the side-dump body 42 are extended which causes the side-dump body 42 to be pivotally moved to the left side of the wheeled frame 32 with the pivot pins 104 and 106 pivotally moving with respect to the saddle supports 88 and 90 respectively.

If it is desired to pivot the side-dump body 42 from the transport position of FIG. 3 to a dumping position at the right side, as viewed from the rear of the wheeled frame, the locking devices 96 and 98 are unlocked with the locking devices 84 and 86 being locked. The extension of the hydraulic cylinders at the forward and rearward ends of the side-dump body 42 then cause the side-dump body to pivotally move to the height as viewed from the rear of the vehicle with the pivot pins 106 and 110 pivotally moving in the saddle supports 92 and 94.

It can be seen that at all times during the pivotal movement of the side-dump body with respect to the wheeled frame, the pivot pins are located directly above the frame members 52 and 54 and preferably centered over the top flanges 56 and 62 thereof. The fact that the pivot pins are not positioned laterally outwardly of the frame members 52 and 54 causes the loads imposed on the saddle assemblies to be supported by the frame members 52 and 54 respectively.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:

a wheeled frame means having a rearward end, a forward end, and first and second sides;

said frame means including first and second elongated, longitudinally extending frame members which are horizontally spaced apart;

an elongated side-dump body movably positioned on said wheeled frame means and having a forward end, a rearward end, opposite sides, and an open support end for receiving materials to be transported;

said side-dump body including a bottom wall portion, a forward wall, a rearward wall, and first and second side walls which extend upwardly from said bottom wall portion;

a first saddle assembly supported upon said first frame member adjacent the forward end thereof so as to be positioned directly above said first frame member;

a second saddle assembly supported upon said first frame member rearwardly of said first saddle support so as to be directly positioned above said first frame member;

a third saddle assembly supported upon said second frame member adjacent the forward end thereof so as to be positioned directly above said second frame member;

a fourth saddle assembly supported upon said second frame member rearwardly of said third saddle support so as to be positioned directly above said second frame member;

said first, second, third and fourth saddle assemblies including first, second, third and fourth saddle supports respectively which are positioned directly above said frame members so that said first and second saddle supports dwell in the same vertical plane as said first frame member and so that said third and fourth saddle supports dwell in the same vertical plane as said second frame member;

a first pivot pin means secured to said side-dump body adjacent the forward end thereof adapted to be selectively removably and pivotally received by said first saddle support;

a second pivot pin means secured to said side-dump body adjacent the rearward end thereof adapted to be selectively removably and pivotally received by said second saddle support;

a third pivot pin means secured to said side-dump body adjacent the forward end thereof adapted to be selectively removably and pivotally received by said third saddle support;

a fourth pivot pin means secured to said side-dump body adjacent the rearward end thereof adapted to be selectively removably and pivotally received by said fourth saddle support;

first, second, third and fourth locking devices selectively movable between locked and unlocked positions for selectively maintaining said first, second, third and fourth pivot pin means in said first, second, third and fourth saddle supports respectively when in their locked positions;

a first power cylinder having a base end pivotally secured to said wheeled frame intermediate the sides thereof forwardly of said side-dump body and a rod end pivotally secured to said forward wall member of said body intermediate the sides thereof;

a second power cylinder having a base end pivotally secured to said wheeled frame intermediate the sides thereof rearwardly of said side-dump body and a rod end pivotally secured to said rearward wall of said body intermediate the sides thereof;

and means for simultaneously selectively extending the rods of said first and second power cylinders whereby said side-dump body will dump the material therein from one side of side-dump body when said first and second locking devices are in their locked positions and said third and fourth locking devices are in their unlocked positions and whereby said side-dump body will dump the material therein from the other side of said side-dump body when said third and fourth locking devices are in their locked positions and said first and second locking devices are in their said unlocked positions.

2. The combination of claim 1 wherein each of said first, second, third and fourth saddle supports have a pocket provided therein which receives the respective pivot pin means therein and wherein the pockets of said first and second saddle supports are centered directly above said first frame member and wherein the pockets of said third and fourth saddle supports are centered directly above said second frame member so that the pockets of said first and second saddle supports dwell in the same vertical plane as said first frame member and so that the pockets of said third and fourth saddle supports dwell in the same vertical plane as said second frame member.

3. The combination of claim 1 wherein each of said first and second frame members include an upper flange which dwells in a horizontal plane and wherein each of said first, second, third and fourth saddle supports have a pocket provided therein which receives the respective pivot pin means and wherein the pockets of said first and second saddle supports are centered directly above the upper flange of said first frame member and wherein the pockets of said third and fourth saddle supports are centered directly above the upper flange of said second frame member so that the pockets of said first and second saddle supports dwell in the same vertical plane as said first frame member and so that the pockets of said third and fourth saddle supports dwell in the same vertical plane as said second frame member.

4. The combination of claim 1 wherein a first transversely extending cross-frame member, having a first end, a second end, an upper end, and a lower end, is secured to and extends between and over said first and second frame members adjacent the forward ends thereof and wherein a second transversely extending cross-frame member, having a first end, a second end, an upper end, and a lower end, is secured to and extends between and over said first and second frame members adjacent the rearward ends thereof, said first and third saddle supports being positioned at said first and second ends of said first cross-frame member respectively, said second and fourth saddle supports being positioned at said first and second ends of said second cross-frame member respectively.

5. The combination of claim 2 wherein a first transversely extending cross-frame member, having a first end, a second end, an upper end, and a lower end, is secured to and extends between and over said first and second frame members adjacent the forward ends thereof and wherein a second transversely extending cross-frame member, having a first end, a second end, an upper end, and a lower end, is secured to and extends between and over said first and second frame members, adjacent the rearward ends thereof, said first and third saddle supports being positioned at said first and second ends of said first cross-frame member respectively, said second and fourth saddle supports being positioned at said first and second ends of said second cross-frame member respectively.

6. The combination of claim 3 wherein a first transversely extending cross-frame member, having a first end, a second end, an upper end, and a lower end, is secured to and extends between and over said first and second frame members adjacent the forward ends thereof and wherein a second transversely extending cross-frame member, having a first end, a second end, an upper end, and a lower end, is secured to and extends between and over said first and second frame members, adjacent the rearward ends thereof, said first and third saddle supports being positioned at said first and second ends of said first cross-frame member respectively, said second and fourth saddle supports being positioned at said first and second ends of said second cross-frame member respectively.

* * * * *